(12) United States Patent
Uang

(10) Patent No.: US 8,518,171 B2
(45) Date of Patent: Aug. 27, 2013

(54) MODELING COMPOUNDS

(75) Inventor: Yuh-Jye Uang, Chesterfield, MO (US)

(73) Assignee: Apex Materials Corporation, St. Louis, MO (US)

( * ) Notice: Subject to any disclaimer, the term of this patent is extended or adjusted under 35 U.S.C. 154(b) by 75 days.

(21) Appl. No.: 12/928,230

(22) Filed: Dec. 7, 2010

(65) Prior Publication Data

US 2011/0146534 A1 Jun. 23, 2011

Related U.S. Application Data

(60) Provisional application No. 61/283,896, filed on Dec. 10, 2009.

(51) Int. Cl.
 *C08L 3/00* (2006.01)
(52) U.S. Cl.
 USPC .................................. 106/206.1; 106/217.01
(58) Field of Classification Search
 None
 See application file for complete search history.

(56) References Cited

U.S. PATENT DOCUMENTS

| | | | |
|---|---|---|---|
| 3,167,440 A | 1/1965 | McVicker et al. | |
| 4,386,964 A | 6/1983 | Herbert | |
| 5,364,892 A * | 11/1994 | Miller et al. | 523/218 |
| 6,107,371 A * | 8/2000 | Roesser et al. | 524/47 |
| 6,713,624 B1 * | 3/2004 | Doane et al. | 536/45 |
| 7,098,292 B2 * | 8/2006 | Zhao et al. | 528/272 |
| 7,132,463 B2 * | 11/2006 | Hwang et al. | 523/124 |
| 8,043,539 B2 * | 10/2011 | Ozasa et al. | 264/46.4 |
| 2006/0228319 A1 * | 10/2006 | Vona et al. | 424/70.13 |
| 2007/0241306 A1 * | 10/2007 | Wehner et al. | 252/67 |
| 2010/0144942 A1 * | 6/2010 | Kao | 524/315 |

* cited by examiner

*Primary Examiner* — Patricia L Hailey
*Assistant Examiner* — Stefanie Cohen
(74) *Attorney, Agent, or Firm* — Paul M Denk

(57) ABSTRACT

The present invention provides modeling play materials comprising cooked tapioca starch, water, salt, lubricant, foaming agent, thickener, and filler. With higher amount of foaming agent, the play material can be molded as any designed shape of soap. The dough of the invention is excellent in formability, shape preservation of the molded shape in both two dimensional and three dimensional.

3 Claims, No Drawings

MODELING COMPOUNDS

CROSS REFERENCE TO RELATED APPLICATION

This non provisional patent application claims priority to the provisional patent application having Ser. No. 61/283,896, having filing date of Dec. 10, 2009.

FIELD OF THE INVENTION

The present invention provides modeling play composition comprising tapioca starch, water, salt, humectant, lubricant, foaming agent, thickener, and filler. With higher amount of foaming agent, the play material can be molded as any designed shape of soap. The dough of the invention is excellent in formability, shape preservation of the molded shape in both two dimensional and three dimensional.

BACKGROUND OF THE INVENTION

There are various compositions of starch based modeling dough. While the variety of such play material composition is really endless, in general all involve the use of malleable material such as oil and water based gel and gel compounds can be deformed into a desired shaped by hands to form a craft. The heavyweight modeling clay and starch or gel base with minerals filler have been used previously. Currently lightweight dough has been more popular because easy modeling and good workability. Lightweight dough contains lightweight hollow microsphere which is major component in volume, and binder, additives and water as the minor in volume. IT depends on the binder base such as polyvinyl alcohol base, starch base, and clay base.

Some starch-based modeling compositions are described in U.S. Pat. No. 3,167,440 to McVicker, Noah W., et al. disclosed a modeling composition consisting essentially of vegetable flour, such as grain flour which is adapted to be gelatinized; water, a hydrocarbon distillate and a soluble saline extender. Preferably also a drying agent, a hardener and astringent agent for binding the composition into a cohesive mass sometimes are included. U.S. Pat. No. 4,386,964 to Herbert, Virginia disclosed a modeling composition in clued the ingredients for flour, salt, oil, and water. The modeling compounds are of a soft pliable consistency such that they can be molded into any desired shape or form. U.S. Pat. No. 6,713,624 to Doane, Jr. Linwood E. disclosed a starch-based modeling compound included a starch-based binder and about 2% to about 10% retrogradation inhibitor, such as waxy corn starch.

SUMMARY OF THE INVENTION

The present invention provides a starch-based modeling composition, such as modeling dough, comprising cooked tapioca starch, humectants, filler, lubricant, foaming agent, salt and water. The moldable composition of the present invention provides pliable dough having good storage stability, wet ductility; join ability, color. Another advantage of the present invention of the dough is non-sticky, non-staining, non-toxic, and slow drying. In the preferred form, the composition of the invention includes from about 10% to 40% of tapioca starch, from about from 5% to 10% of oil, from about 5% to 20% of humectants, from about 5% to about 10% of filler, from about 30% to 60% of water, from 1% to 10% of salts, from 0.5% to 2.0% of wetting agent, and from 0.1% to 1.0% of preservative. It is, therefore, the principal object of this invention to provide a modeling dough formed from a variety of annouclous components made up of a starch-based composition.

Another object of this invention is to provide a modeling compound provided of a starch-base composition, and including one or more foaming agents, to allow the composition to be molded, and also function as a cleaning agent, such as a soap.

These and other objects may become more apparent to those skilled in the art upon review of the summary of the invention as provided herein, and upon undertaken a study of the description of its preferred embodiment.

DESCRIPTION OF THE PREFERRED EMBODIMENT

The present invention provides modeling dough comprising optimal cook tapioca starch, fillers, humectants, oils, salts, water and preservative.

Starch is made up of two molecules: amylase and amylopectin. Amylose consists of long helical chains, and amylopectin has a branched structure. Starch does not have a uniform composition. Its molecular structure and amylose/amylopectin ratio vary according to plant source. Thus, the processing characteristics and end properties will vary similarly. The most important methods of differentiation between starches are the molecular weight of the amylose fraction and the ratio of amylose to amylopectin.

While amylopectin can be supplied in clod water soluble form, amylose is insoluble. AMylose can be dissolved with strong alkali, by cooking with formaldehyde, or by cooking water at 150-160° C. under pressure. Upon cooling or neutralization such amylose dispersions will form firm gels at concentrations higher than 2% and precipitate at concentrations lower than 2%. Amylose fractions are never truly soluble in water and in time will form crystalline aggregates by hydrogen bonding—a process know as retrogradation or setback. Retrogradation is the cause of viscosity instability in modeling dough. The amylopectin is more soluble and less prone to retrogradation. The percent of amylose in various starches. Most starches contain 20-30% by weight of amylose although certain specialty types can have as little as 0% or as high as 80%. Because of the amylose fraction, starch suspended in clod water is essentially unable to act as modeling dough because the starch is so tightly bound in crystalline regions. These granules must be opened through processing to obtain cohesive structure.

Heating in water is the simplest method of breaking up the starch granules. On heating in water, starch granules first swell and then burst open with a resulting thickening of the suspension. The temperature at which this thickening of the suspension occurs is called the gelation temperature. For most starches in pure water, gelation occurs between 57 and 72° C. In this form the starch is not a true solution but a colloidal suspension.

The heating process can take one of two forms. In the first, salts (usually the chlorides of metals such as calcium, and magnesium) are added to a suspension of the starch in water, and the starch-base modeling paste is produced by control of the temperature and the time of stirring. The starch paste now has a high viscosity and acts as an adhesive. If the concentration of the starch is above 7% then the cooked paste is very viscous and difficult to pump. Above 15% starch solids content, the cooked paste forms an immobile rubbery mass on cooling. Suspensions with a higher amylose/amylopectin ratio will have a higher viscosity. More than 25% starch solid content, the cooked starch from very cohesive rubbery paste.

In the present invention, cooked tapioca starch was used to prepare the modeling paste. Cooked tapioca starch forms a quite clear gel with a long and slightly stringy texture. Upon cooling, it sets to a soft gel. It loses most of its thickening ability during prolonged heating and under acidic conditions. The cooked gel resembles that of potato, but the texture is less stringy. The preferred weight percent is 20 to 45%.

The humectant is preferably added to prevent the hydration of the starch and soft the starch. The preferably humectant is propylene glycol because it is a good modifier in this starch-based gel modeling dough system. This gel modifier can adjust the gel set time and final firmness of the modeling dough. The content of propylene glycol in the present invention is from 2 to 15% by weight, and preferably 0.5 to 15% by weight.

The foaming agent can reduce the sticky of surface of the modified starch based modeling dough. Usually the surfactant consist both polar and non-polar group. Since the granule structure of starch contain a lot of polar group such as gydroxyl group, we need to remove the water from the surface of the granule to prevent the sticky of the surface. During the gelatinization and kneading, the head polar of surfactant will be associated with hydroxyl group of starch particles. The non-polar part of surfactant is hydrophobic type and outward to the surface of modeling dough. This effect will help to reduce the tackiness and increase the smoothness of surface of modeling dough. One preferred wetting agent is lauramidoproply betaine. The preferred weight percent is 0.5 to 2%. Another type of surfactants is foaming agents. With foaming agents in the modeling composition, we can mold the modeling paste into designed shape and served as soap bar. The foaming agent can be sodium laureth sulfate, cocamidopropyl betain, cocamide MEA, disodium lauryl sulfosuccinate. The preferred foaming agents are sodium laureth sulfate, cocamidopropyl betain, cocamid MEA and the mixture thereof. The preferred weight percent is 8 to 15%.

A lubricant is very necessary additive to prevent the stick surface of starch-based modeling dough. The lubricant can be long-chain alkyl alcohol. The preferred alkyl alcohol is stearyl alcohol, oley alcohol, cetyl alcohol, isocetyl alcohol. Other type of lubricant is hydrogenated polybutylenes oil, and preferably have molecular weights of between about 200 and about 2000 and most preferably between about 250 and about 500. The preferred amount used in the present invention is 0.5 to 10% by weight.

A salt can be used as function of moisture and preservatives. The salts are sodium chloride, potassium chloride, calcium chloride and magnesium chloride. The salt in the present invention is preferred magnesium chloride. The salt is used in amount from 2.0 to 25% by weight.

A filler is used to function as a mold forming agent. The preferred filler materials include kaolin, bentonite, talc and mixtures thereof. Other filler materials include starch such as corn, potato, tapioca. The filler is used in amount from 10 to 45% by weight. The filler can also comprise ethyl vinyl acetate foam particles having a diameter of 6-8 mm, with the density of moldable clay.

Furthermore, the content of water is preferably from 20 to 50% by weight of the dough, and more preferably 30 to 40% by weight.

The composition is preferred by a process comprising the following steps:
i.) Fill double jacketed process vessel with unheated water. Turn on mixer and adjusted to a speed of 80-100 rpm. Top blade should be submerged to half the height of the water. Add xamthan gum hydroxyproply cellulose, and preservative first. Then glycerin, propylene glycol, mineral oil was added in orders prior to any tapioca starch addition.
ii.) Add the tapioca starch powder to unheated mixture with agitation. Increase solution temperature to 70° C., hold at temperature for 10 minutes.
iii.) Add surfactant after temperature is cool. Discharge the fully compounded cooked tapioca starch elastic paste from mixer to a process tank with kneader.
iv.) Kaolin, talc, and bentonite were added into process kneader machine. After the mixture compounds was kneading to obtain smooth texture of the surface of the modeling dough.
v.) Surfactant was added partially into process tank to reduce the tackiness of the surface of the dough.

EXAMPLE 1

The modeling compositions of the present invention most preferably comprise the following components by weight:

| | |
|---|---|
| a.) water | 23.85 grams |
| b.) cooked tapioca starch | 22.72 grams |
| c.) lubricants | 7.65 grams |
| d.) salts | 7.16 grams |
| e.) foaming agent | 1.03 grams |
| f.) filler | 35.19 grams |
| g.) humectants | 1.95 grams |
| h.) thickeners | 0.34 grams |
| i.) preservatives | 0.11 grams |

EXAMPLE 2

The modeling foaming compositions of the present invention most preferably comprise the following components by weights:

| | |
|---|---|
| a.) water | 31.00 grams |
| b.) cooked tapioca starch | 35.00 grams |
| c.) humectants | 9.00 grams |
| d.) lubricants | 3.00 grams |
| e.) preservatives | 0.11 grams |
| f.) foaming agents | 10.00 grams |
| g.) fillers | 15.00 grams |
| h.) thickener | 0.34 grams |
| i.) colorants | 0.01 grams |

Modifications and alternative embodiments of the invention will be apparent to those skilled in the art in view of the forgoing description. The details of the structure and method may be varied substantially without departing from the spirit of the invention, and the exclusive use of the appended claims is reserved.

I claim:
1. A play moldable foaming composition comprising a starch-based moldable play composition, comprising:
   5-20% by weight tapioca starch, said tapioca starch consisting of less than 20% of amylase, and said tapioca starch is gelatinized by cooking;
   5-25% by weight filler, said filler is kaolin, talc, bentonite, and a mixture thereof;
   0.1-5.0% by weight lubricant, said lubricant is selected from the group consisting of isocetyl alcohol, and hydrogenated polybutene oil;

5-10% by weight of a humectant, said humectant is glycerin, propylene glycol and a mixture thereof;

10-20% by weight of a foaming agent, said foaming agent is selected from the group consisting of sodium lauryl ether sulfate, cocamidopropyl dimethyl glycine, and coconut fatty acid momoethanolaminde;

0.1-1.0% by weight preservative, said preservative is sodium benzoate; and 25-50% by weight water.

2. The moldable composition of claim 1, wherein said composition includes salt, and said salt is magnesium chloride.

3. The moldable composition of claim 1 wherein said moldable play composition can be molded into the designed shape of a soap.

* * * * *